United States Patent
Kumagai et al.

(10) Patent No.: US 7,794,893 B2
(45) Date of Patent: Sep. 14, 2010

(54) POLYMER ELECTROLYTE MEMBRANE, MEMBRANE ELECTRODE ASSEMBLY, AND FUEL CELL

(75) Inventors: Mamiko Kumagai, Tokyo (JP); Kenji Yamada, Yokohama (JP); Kazuhiro Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/108,043

(22) Filed: Apr. 23, 2008

(65) Prior Publication Data

US 2008/0268317 A1  Oct. 30, 2008

(30) Foreign Application Priority Data

Apr. 27, 2007  (JP) .............................. 2007-120000

(51) Int. Cl.
*H01M 8/10* (2006.01)
(52) U.S. Cl. ................... 429/492; 429/497; 429/491
(58) Field of Classification Search ............... 429/30, 429/41, 44
See application file for complete search history.

(56) References Cited

U.S. PATENT DOCUMENTS

2007/0026282 A1 *  2/2007  Kumagai et al. .............. 429/30

FOREIGN PATENT DOCUMENTS

JP  2003-142125  *  5/2003
JP  3921997 B2     3/2007

OTHER PUBLICATIONS

J. Bandrup et al. (eds.), Polymer Handbook, Third Edition, John Wiley & Sons, New York, pp. VII/519-59 (1989).

* cited by examiner

*Primary Examiner*—Dah-Wei Yuan
*Assistant Examiner*—Angela J. Martin
(74) *Attorney, Agent, or Firm*—Fitzpatrick, Cella, Harper & Scinto

(57) ABSTRACT

Provided are a polymer electrolyte membrane, which includes an ion conductive domain having high continuity and a non-ion conductive domain and has a high strength, and a membrane electrode assembly and a fuel cell each using the polymer electrolyte membrane. The polymer electrolyte membrane includes a block copolymer having an ion conductive block and a non-ion conductive block and has a microphase separation structure constituted of an ion conductive domain including the ion conductive block and a non-ion conductive domain including the non-ion conductive block.

5 Claims, 7 Drawing Sheets

POLYMER ELECTROLYTE MEMBRANE, MEMBRANE ELECTRODE ASSEMBLY, AND FUEL CELL

BACKGROUND OF THE INVENTION

1. Field of the Invention

The present invention relates to a polymer electrolyte membrane, a membrane electrode assembly, and a fuel cell.

2. Description of the Related Art

Japanese Patent No. 3,921,997 discloses a polymer electrolyte membrane having a micro-phase separation structure formed of a block copolymer. The polymer electrolyte membrane includes an ion conductive domain including an ion conductive block and a non-ion conductive domain including a non-ion conductive block.

When a polymer membrane of this type includes ion conductive domains with a network micro-phase separation structure, the ion conductive domains have high continuity and have high ion conductivity.

However, there has been a problem that in order to maintain high continuity, a network micro-phase separation structure generally needs to be constituted by a block copolymer including an ion conductive block at a high volume fraction, which makes the strength of the polymer electrolyte membrane insufficient.

In order to allow the polymer electrolyte membrane to have a higher strength, when the volume fraction of a non-ion conductive block in the block copolymer is increased, the micro-phase separation structure does not form a network, so that the ion conductivity is reduced.

SUMMARY OF THE INVENTION

In view of the above-mentioned problems, it is an object of the present invention to provide a polymer electrolyte membrane, which has an ion conductive domain having high continuity and excellent membrane strength.

It is another object of the present invention to provide a membrane electrode assembly and a fuel cell using the polymer electrolyte membrane.

According to the first aspect of the present invention, there is provided a polymer electrolyte membrane, which includes a block copolymer having an ion conductive block and a non-ion conductive block and which has a micro-phase separation structure constituted of an ion conductive domain including the ion conductive block and a non-ion conductive domain including the non-ion conductive block, in which the volume fraction of the non-ion conductive block in the block copolymer is 75% or more and less than 95%, in which the ion conductive domain forms a worm-like shaped continuous phase, in which the non-ion conductive domain forms a matrix portion, and in which the aspect ratio b/a of an average diameter a and a persistence length b of the ion conductive domain is 100 or more.

In the present invention, it is preferred that the ion conductive block include a polymer having an ion-exchange group.

According to another aspect of the present invention, there is provided a membrane electrode assembly including the polymer electrolyte membrane.

According to still another aspect of the present invention, there is provided a membrane electrode assembly including the membrane electrode assembly.

Further features of the present invention will become apparent from the following description of exemplary embodiments with reference to the attached drawings.

DESCRIPTION OF THE EMBODIMENTS

The present invention will be described in detail below with reference to the attached drawings.

The polymer electrolyte membrane according to the present invention includes a block copolymer including an ion conductive block and a non-ion conductive block and has a micro-phase separation structure constituted of an ion conductive domain including the ion conductive block and a non-ion conductive domain including the non-ion conductive block, in which the volume fraction of the non-ion conductive block in the block copolymer is 75% or more and less than 95%, in which the ion conductive domain forms a worm-like shaped continuous phase, in which the non-ion conductive domain forms a matrix portion, and in which the aspect ratio b/a of an average diameter a and a persistence length b of the ion conductive domain is 100 or more.

Figure 1:
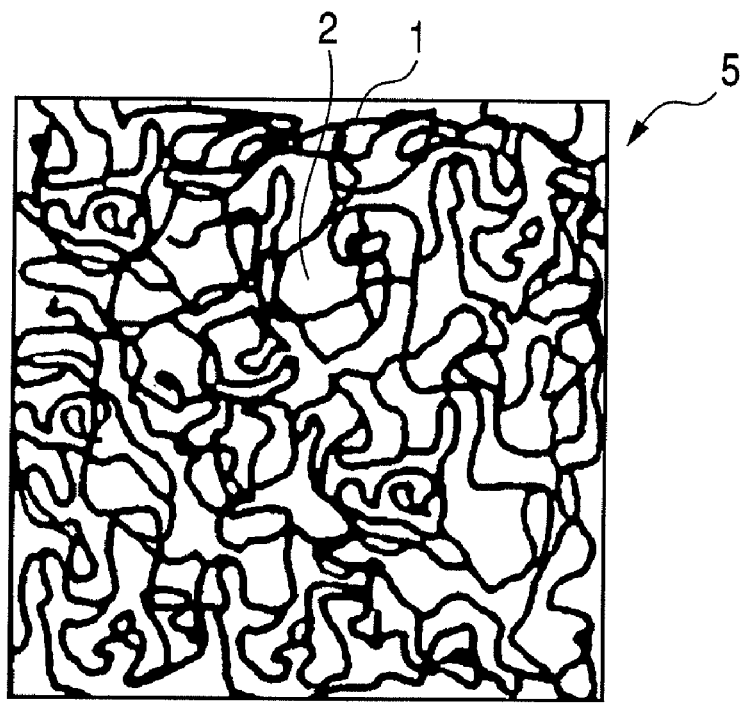
FIG. 1 is a schematic view illustrating a micro-phase separation structure of a polymer electrolyte membrane.

FIG. 1 is a schematic view illustrating a polymer electrolyte membrane according to an embodiment of the present invention, which has a micro-phase separation structure.

In FIG. 1, a polymer electrolyte membrane 5 consists of an ion conductive domain 1 and a non-ion conductive domain 2. The ion conductive domain 1 forms a continuous phase, while the non-ion conductive domain 2 forms a matrix portion.

Hereinafter, the respective components will be described.

Figure 2:
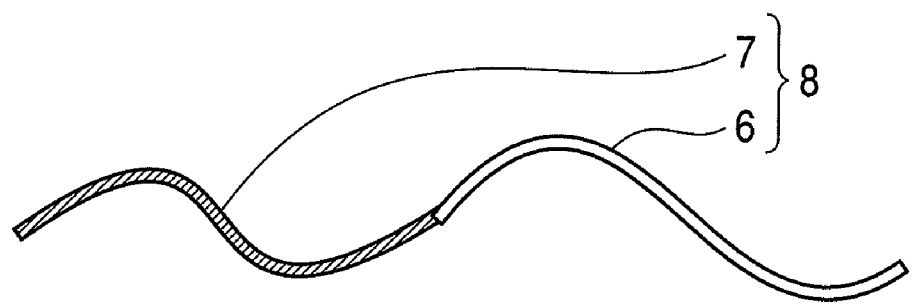
FIG. 2 is a schematic view illustrating a block copolymer.

In FIG. 2, a block copolymer 8, an ion conductive block 6, and a non-ion conductive block 7 are illustrated.

The ion conductive block 6 and the non-ion conductive block 7 of the block copolymer 8 associate in a self-organizing manner to form a micro-phase separation structure. The micro-phase separation structure is constituted of domains of 100 nanometers to 50 micrometers in size.

The ion conductive domain 1 is constituted of the ion conductive block 6 of the block copolymer 8, which forms the polymer electrolyte membrane 5.

The ion conductive domain 1 has an average diameter a and a persistence length b and has an aspect ratio b/a of 100 or more. Since the ion conductive domain 1 has the aspect ratio b/a of 100 or more, the ion conductive domain 1 forms a continuous phase extending over a wide range without being divided, thereby providing a structure in which the ion conductive domain 1 has a large persistence length. The term "average diameter a" herein employed refers to an average of widths of an ion conductive domain, and the term "persistence length" refers to a largest length that is measured from one end to another end of a domain, which forms a continuous phase along the domain. Accordingly, when a domain is, for example, branched and has three or more ends, the largest length between any two of those ends is referred to as "persistence length." The average diameter a and persistence length b of domains forming a continuous phase can be determined by observing images of the polymer electrolyte membrane obtained by an atomic force microscope (hereinafter referred to as AFM) or a transmission electron microscope (hereinafter referred to as TEM) and measuring target lengths in the images directly or after image processing. The aspect ratio b/a of the persistence length b to the average diameter a is preferably 1,000 or more, more preferably 3,000 or more, and further preferably 3,500 or more. In addition, the average diameter a is preferably 10 nm or more. When an ion conductive domain has a diameter of 10 nm or less, the polymer chain needs to have a sufficiently small length, whereby the ion conductive block 6 and the non-ion conductive block 7 may be compatible with each other and fail to achieve phase separation.

Such an ion conductive domain 1 forms a continuous phase of a worm-like shape, as illustrated in FIG. 1. The term "worm-like shape" herein employed generally means an earthworm-like, thin, long structure (worm-like structure) known in the field of polymers. The expression "ion conductive domain in worm-like shape" refers to a structure formed by bending or branching of the ion conductive domain. Incidentally, in the "worm-like shape" as employed herein, domains may be bent, form an arc, have two or more branches, and/or be repeatedly connected with each other.

In the micro-phase separation structure formed by block copolymers, there are generally present those regions (grains) where microdomains are regularly arranged, and the continuity of the domains is diminished at a borderline (grain boundary) between the grains.

However, when the ion conductive domain 1 has the above-mentioned worm-like shape, since the ion conductive domains are not arranged in one direction, although there is no regularity, there is attained a state in which grains are substantially absent. This enables the continuous phase constituted of the ion conductive domain 1 to have a structure in which the continuity of the ion conductive domain is kept high with substantially no grain boundaries over a wide range.

Further, the matrix portion is constituted of the non-ion conductive domain 2 formed of the non-ion conductive block 7 of the block copolymer 8 that forms the polymer membrane. The term "matrix portion" herein employed refers to a structure that surrounds the continuous phase. Accordingly, the expression "the non-ion conductive domain forms a matrix" means a "structure in which the non-ion conductive domain surrounds the ion conductive domains." When the expression "the non-ion conductive domain surrounds the ion conductive domains" is used, it is enough that most of ion conductive domains are surrounded by non-ion conductive domain and all the ion conductive domains may not be necessarily surrounded by the non-ion conductive domain.

Next, the block copolymer 8 will be described.

The block copolymer 8 is constituted of the ion conductive block 6 and the non-ion conductive block 7.

The ion conductive block 6 may be a polymer, which has ion-exchange group(s) and can synthetically form the block copolymer. The ion-exchange group is not particularly limited and is selected arbitrarily according to the intended use. Particularly preferred ion-exchange groups include groups of sulfonic acid, carboxylic acid, phosphoric acid, phosphonic acid, and phosphonous acid. The polymer may contain one or more kinds of ion-exchange groups. The amount of the ion-exchange group is not particularly limited, as long as a spherical structure is formed when membrane formation is performed by a common solution casting method.

Examples of chemical structures of repeating units constituting such an ion conductive block include sulfonic acid (sulfonate) group-containing styrene, sulfonic acid (sulfonate)-containing (meth)acrylates, sulfonic acid (sulfonate)-containing (meth)acrylamides, sulfonic acid (sulfonate) group-containing butadiene, sulfonic acid (sulfonate) group-containing isoprene, sulfonic acid (sulfonate) group-containing ethylene, and sulfonic acid (sulfonate) group-containing propylene, but are not limited thereto. Further, to improve the strength and dimensional stability and/or to clarify the phase-separated structure of the electrolyte membrane, there may also be used chemical structures obtained by incorporating fluorine into the above chemical structures, such as ethylene-tetrafluoroethylene-styrene sulfonic acid, perfluorocarbonsulfonic acids, perfluorocarbonphosphonic acid, and trifluorostyrenesulfonic acid.

The method of synthesizing the block copolymer having ion-exchange group(s) is not particularly limited and is selected suitably according to the type of monomers used. The method includes, for example, living polymerization and reaction of a non-ion conductive block prepolymer with an ion conductive block prepolymer to yield a copolymer. The method can be suitably selected according to the intended use. In such a method, a monomer having an ion-exchange group may be used, or ion-exchange group(s) may be introduced into a synthesized block copolymer.

The material for the non-ion conductive block 7 may be a regular polymer having no ion-exchange group. Examples of such a polymer include polymers synthesized from monomers, such as acrylates, methacrylates, styrene derivatives, conjugated dienes, and vinyl ester compounds. As a monomer for forming the non-ion conductive polymer other than the above-mentioned monomers, the following can be exemplified:

styrene and α-, o-, m-, p-alkyl-, alkoxyl-, halogen-, haloalkyl-, nitro-, cyano-, amide-, and ester-substituted styrene;

polymerizable unsaturated aromatic compounds, such as 2,4-dimethyl styrene, para-dimethylamino styrene, vinylbenzyl chloride, vinylbenzaldehyde, indene, 1-methylindene, acenaphthalene, vinylnaphthalene, vinylanthracene, vinylcarbazole, 2-vinylpyridine, 4-vinylpyridine, and 2-vinylfluorene;

alkyl(meth)acrylates, such as methyl(meth)acrylate, ethyl (meth)acrylate, n-propyl acrylate, n-butyl acrylate, 2-ethylhexyl(meth)acrylate, and stearyl(meth)acrylate;

unsaturated monocarboxylates, such as methyl crotonate, ethyl crotonate, methyl succinate, and ethyl succinate; fluoroalkyl(meth)acrylates, such as trifluoroethyl(meth)acrylate, pentafluoropropyl(meth)acrylate, and heptafluorobutyl(meth)acrylate;

siloxanyl compounds, such as trimethylsiloxanyl dimethylsilylpropyl(meth)acrylate, tris(trimethylsiloxanyl)silylpropyl(meth)acrylate, and di(meth)acryloylpropyl dimethylsilylether;

hydroxyalkyl(meth)acrylates, such as 2-hydroxyethyl (meth)acrylate, 2-hydroxypropyl(meth)acrylate, and 3-hydroxypropyl(meth)acrylate; amine-containing (meth)acrylates, such as dimethylaminoethyl(meth)acrylate, diethylaminoethyl(meth)acrylate, and t-butylaminoethyl (meth)acrylate;

hydroxyalkyl esters of an unsaturated carboxylic acid, such as 2-hydroxyethyl crotonate, 2-hydroxypropyl crotonate, and 2-hydroxypropyl succinate; unsaturated alcohols, such as (meth)allyl alcohol;

unsaturated (mono)carboxylic acids, such as (meth)acrylic acid, crotonic acid, and succinic acid; epoxy group-containing (meth)acrylates, such as glycidyl(meth)acrylate, glycidyl α-ethylacrylate, glycidyl α-n-propyl acrylate, glycidyl α-n-butyl acrylate, 3,4-epoxybutyl(meth)acrylate, 6,7-epoxyheptyl(meth)acrylate, 6,7-epoxyheptyl α-ethyl acrylate, o-vinylbenzyl glycidyl ether, m-vinylbenzyl glycidyl ether, p-vinylbenzyl glycidyl ether, β-methylglycidyl(meth)acrylate, β-ethylglycidyl(meth)acrylate, β-propylglycidyl(meth)acrylate, β-methylglycidyl α-ethyl acrylate, 3-methyl-3,4-epoxybutyl(meth)acrylate, 3-ethyl-3,4-epoxybutyl(meth)acrylate, 4-methyl-4,5-epoxypentyl(meth)acrylate, 5-methyl-5,6-epoxyhexyl(meth)acrylate, β-methylglycidyl (meth)acrylate, and 3-methyl-3,4-epoxybutyl(meth)acrylate; and monoesters or diesters thereof;

maleimides, such as N-methyl maleimide, N-butyl maleimide, N-phenyl maleimide, N-o-methylphenyl maleimide, N-m-methylphenyl maleimide, N-p-methylphenyl maleimide, N-o-hydroxyphenyl maleimide, N-m-hydroxyphenyl maleimide, N-p-hydroxyphenyl maleimide, N-methoxyphenyl maleimide, N-m-methoxyphenyl maleimide, N-p-methoxyphenyl maleimide, N-o-chlorophenyl maleimide, N-m-chlorophenyl maleimide, N-p-chlorophenyl maleimide, N-o-carboxyphenyl maleimide, N-p-carboxyphenyl maleimide, N-p-nitrophenyl maleimide, N-ethyl maleimide, N-cyclohexylmaleimide, and N-isopropyl maleimide; (meth)acrylonitrile; and vinyl chloride, but examples of the monomers are not limited thereto.

The molecular weight of the block copolymer 8 is not particularly limited, as long as the micro-phase separation structure is formed.

The block copolymer 8 contains the non-ion conductive block 7 in a volume fraction of 75% or more and less than 95%. In other words, the block copolymer 8 contains the ion conductive block 6 in a volume fraction of 5% or more and less than 25%. When the non-ion conductive block has a volume fraction within the above-mentioned range, the obtained polymer electrolyte membrane swells less and has excellent membrane strength and high ion conductivity. When the block copolymer contains the non-ion conductive block in a volume fraction of 95% or more, the phase separated structure may not be formed and high ion conductivity may not be achieved. When the block copolymer contains the non-ion conductive block in a volume fraction less than 75%, as will be explained later, a micro-phase separation structure, when formed by a common solution casting method, may not form a spherical structure, whereby the worm-like shape according to the present invention may not be obtained.

The term "volume fraction" herein employed refers to the volume fraction of a block chain constituting the block copolymer to one molecular chain of the block copolymer. The volume fraction of a block chain may be determined from its molecular weight and specific gravity. The volume fraction can be determined by calculating according to the following equation:

Volume fraction (%)=$(B/b)/\{(A/a+B/b)\} \times 100$, wherein the molecular weight of the non-ion conductive block constituting the block copolymer is represented by A (g/mol); the specific gravity of the non-ion conductive block is represented by a (g/cm$^2$); the molecular weight of the ion conductive block is represented by B (g/mol); and the specific gravity of the ion conductive block is represented by b (g/cm$^2$).

Further, the difference in the solubility parameter δ between the ion conductive block 6 and the non-ion conductive block 7 is preferably 5 (MPa)$^{1/2}$ or more.

Next, a method of producing the polymer electrolyte membrane will be described.

The method of producing the polymer electrolyte membrane includes at least the steps of:

preparing a solution containing at least a block copolymer including an ion conductive block and a non-ion conductive block and a solvent;

applying the solution to a substrate to form a micro-phase separation structure in which the ion conductive block forms a spherical domain and the non-ion conductive domain forms a matrix portion; and removing at least part of the solvent from the structure in a state where an external field is applied.

Figure 3A:
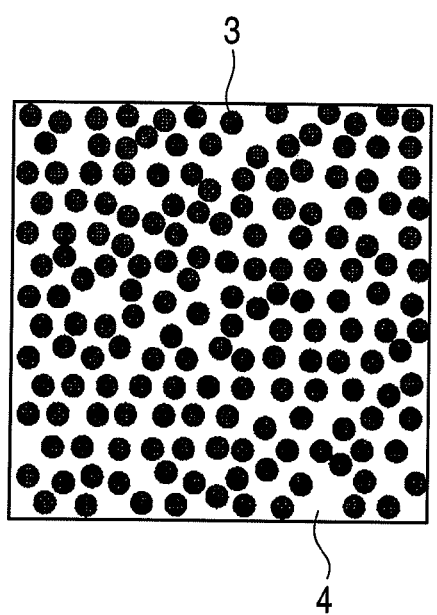
FIGS. 3A and 3B are schematic views illustrating a production method of a polymer electrolyte membrane.
Figure 3B:
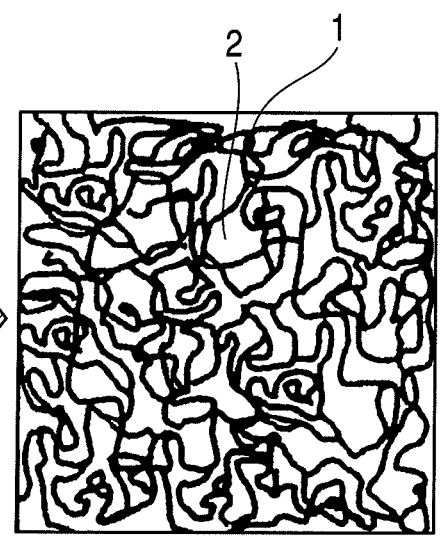

Specifically, with reference to FIG. 3A, a micro-phase separation structure is formed on a substrate in which the ion conductive block forms spherical domains 3 and the non-ion conductive domain forms a matrix 4 portion. Then, in a state where a magnetic field is applied, the solvent is removed from the structure to give a polymer electrolyte membrane as illustrated in FIG. 3B.

Examples of such a method include the following two methods.

In a first method, a solution containing at least a block copolymer including an ion conductive block and a non-ion conductive block and a solvent is prepared. The solution containing the block copolymer including an ion conductive block and a non-ion conductive block is applied to a substrate to form a micro-phase separation structure in which the ion conductive block forms a spherical domain. The solvent is then removed from the structure while applying an external field to the substrate.

In a second method, a solution containing at least a block copolymer including an ion conductive block and a non-ion conductive block and a solvent is prepared. After applying an external field to a substrate, the solution containing the block copolymer including an ion conductive block and a non-ion conductive block is applied to the substrate to form a micro-phase separation structure in which the ion conductive block forms a spherical domain. The solvent is then removed from the structure.

In either method, the removal of the solvent from the solution containing the block copolymer, which has been applied to the substrate, is carried out when an external field is applied. As the method of applying the polymer solution to the substrate, there can be used, for example, spin coating, dipping, roll coating, spraying, or casting. Furthermore, the term "removal of solvent" herein employed is intended to encompass, for example, evaporation of a solvent and replacement of a solvent with another solvent.

The selection of a solvent in which the block copolymer is to be dissolved is important. As described above, since it is necessary to form a spherical domain structure during the membrane formation, a suitable type of solvent needs to be selected depending on the compositional ratio of the employed block copolymer.

The important factor in selecting the solvent is the affinity between respective components of the block copolymer and the solvent. The degree of affinity can be determined using a difference in the solubility parameter. Generally, the smaller is the absolute value of a difference in the solubility parameter between a polymer and a solvent, the higher is the affinity between them. The values of the solubility parameter can be found in documents, such as Brandrup, J. and Immergut, E. H., Polymer Handbook Third Edition, John Wiley & Sons, New York, as described above. To obtain a spherical domain structure, a solvent may be employed, which has a high affinity with the non-ion conductive block constituting the matrix phase of the spherical domain structure.

The degree of the affinity varies depending typically on the type, molecular weight, and compositional ratio of the polymer. Generally, when the solubility parameter $\delta$ $((J/cm^3)^{1/2})$ is adopted, the absolute value of a difference in the solubility parameter $\delta$ between the polymer constituting the non-ion conductive block and the solvent is preferably less than 2, and more preferably less than 1.

The structural transition from the spherical domain structure to the structure with a worm-like shape (hereinafter sometimes also referred to as worm-like structure) is achieved by controlling or selecting the type of solvent for use in the membrane formation, the evaporation rate of the solvent, and the temperature during the membrane formation. As an easier and more convenient procedure, an external field, such as a magnetic field or an electric field, is applied during membrane formation. When an electric field is applied as the external field, the polymer electrolyte membrane is interposed between electrodes and a high electric field is applied. For this purpose, it is preferable that the polymer electrolyte membrane has a thickness of 200 nm or less. When a magnetic field is applied, however, the thickness of the polymer electrolyte membrane is not limited. Accordingly, the polymer electrolyte membrane having a worm-like structure is preferably prepared by utilizing a magnetic field.

When a magnetic field is applied, the direction of applying the magnetic field is not particularly limited and may be in either a horizontal direction or a perpendicular direction with respect to the surface of the film (membrane). The magnetic field need not need necessarily be applied in one direction. A rotating magnetic field may also be utilized. Such a magnetic field may be applied after applying the block copolymer to a substrate, or a solution containing the block copolymer is applied to a substrate while applying a magnetic field.

The intensity of the magnetic field may also be selected depending on the polymer structure and is not particularly limited. When the intensity of magnetic field is low, since the spherical domain structure is not deformed by the magnetic field, the intensity of the employed magnetic field is preferably at least 3 tesla (T), and more preferably at least 5 T.

The phase separation structure of the resulting polymer membrane can be confirmed by observing a surface or cross section of the membrane with AFM or TEM.

Next, a membrane electrode assembly and a fuel cell each provided with the polymer electrolyte membrane according to the present invention will be described.

A membrane electrode assembly according to an aspect of the present invention can be produced by disposing electrodes on the above-described polymer electrolyte membrane according to the present invention. The membrane electrode assembly is constituted of the polymer electrolyte membrane according to the present invention and a pair of catalytic electrodes that face each other with the interposed polymer electrolyte membrane. The catalytic electrode has a catalyst layer formed on a gas diffusion layer. The method of producing the membrane electrode assembly is not particularly limited and any known technology can be used.

Further, by using the polymer electrolyte membrane and the membrane electrode assembly according to the present invention, a fuel cell can be produced according to a known procedure. As an example of the fuel cell, there can be included a structure having the above-mentioned membrane electrode assembly, a pair of separators sandwiching the membrane electrode assembly, collecting electrodes attached to the separators, and a packing. The separator on an anode side has an anode-side opening through which a gaseous fuel or a liquid fuel, such as hydrogen or alcohol (e.g., methanol), is supplied. The separator on a cathode side has a cathode-side opening through which an oxidizer, gas such as oxygen gas or air, is supplied. A metal foam or the like gas flow path may be provided instead of the separator or between the separator and the gas diffusion layer.

By using the polymer electrolyte membrane to produce a fuel cell, the resulting fuel cell can provide a stable high power output over a long period of time.

EXAMPLES

The present invention will be described in further detail with reference to Examples below without limiting the invention thereto in any way. A polymer electrolyte membrane using a block copolymer including a sulfonic acid-containing block and a polystyrene block will be described below by way of examples. First, various polymers were synthesized by the below-mentioned procedures.

Synthetic Example 1

Synthesis of Copolymer (BP-3) Including Sulfonic Acid-Containing Block and Polystyrene Block Under nitrogen atmosphere, 0.6 mmol of copper(I) bromide, 0.6 mmol of 1,1,4,7,10,10-hexamethyltriethylenetetramine, 0.4 mmol of methyl 2-bromopropionate, and 50 mmol of tert-butyl acrylate (tBA) were mixed. After the dissolved oxygen in the mixture was replaced with nitrogen, a reaction was performed at 70° C. The reaction was allowed to proceed while monitoring the polymerization rate through gas chromatography. The reaction was stopped by quenching with liquid nitrogen. The resultant poly-tBA was found to have Mn=10,600 and Mw/Mn=1.07 through gel permeation chromatography (GPC).

Then, 0.4 mmol of the thus obtained poly-tBA having bromine at a terminal thereof, 0.4 mmol of copper(I) bromide, 0.4 mmol of hexamethyltriethylenetetramine, and 800 mmol of styrene (St) were mixed and subjected to nitrogen purging. After a reaction was performed at 100° C., the reaction was stopped by quenching with liquid nitrogen. The resulting polymer was purified by reprecipitation into methanol. The obtained block copolymer, PtBA-b-PSt (BP-1), was found to have Mn=37,000 and Mw/Mn=1.18 according to GPC. From this result, the molecular weights of the respective blocks were calculated to be 10,600 for the PtBA block and 26,400 for the PSt block. The results were well-consistent with the compositional ratio of the both blocks determined from the peak integral ratio in $^1$H-NMR.

Next, the thus obtained block copolymer BP-1 was mixed with trifluoroacetic acid (5 equivalents with respect to t-butyl group) at room temperature in chloroform to perform a deprotection reaction of the tert-butyl group of the PtBA block to effect conversion to a carboxylic acid, whereby polyacrylic acid-b-polystyrene (PAA-b-PSt) (BP-2) was obtained.

The block copolymer BP-2 was present in a carboxylic acid-containing block in a volume fraction of 19%.

The thus obtained block copolymer BP-2 was dissolved in tetrahydrofuran (THF, to which sodium hydride (10 equivalents to the carboxylic acid) and 1,3-propanesultone (20 equivalents to the carboxylic acid) were added. The mixture was heated to reflux to sulfonate the PAA block. Thus, a block copolymer (BP-3), which contained a sulfonic acid group as an ion-exchange group, was obtained. The block copolymer BP-3 contained the sulfonate-containing block in a volume fraction of 25% and the polystyrene block in a volume fraction of 75%. The structural formula of the block copolymer BP-3 is shown below.

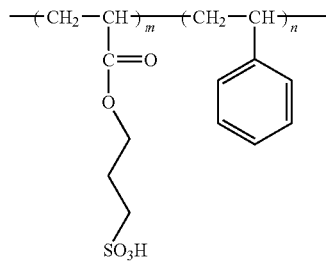

Synthetic Example 2

Synthesis of Copolymer (BP-6) Including Sulfonic Acid-Containing Block and Polystyrene Block Under nitrogen atmosphere, 0.6 mmol of copper(I) bromide, 0.6 mmol of 1,1,4,7,10,10-hexamethyltriethylenetetramine, 0.4 mmol of methyl 2-bromopropionate, and 50 mmol of tert-butyl acrylate (tBA) were mixed. After the dissolved oxygen in the mixture was replaced with nitrogen, a reaction was performed at 70° C. The reaction was allowed to proceed while monitoring the polymerization rate through gas chromatography. The reaction was stopped by quenching with liquid nitrogen. The resultant poly-tBA was found to have Mn=9,100 Mw/Mn=1.01 through gel permeation chromatography (GPC).

Then, 0.4 mmol of the thus obtained poly-tBA having bromine at a terminal, 0.4 mmol of copper(I) bromide, 0.4 mmol of hexamethyltriethylenetetramine, and 800 mmol of styrene were mixed and subjected to nitrogen purging. After a reaction was performed at 100° C., the reaction was stopped by quenching with liquid nitrogen. After the resulting polymer was purified by reprecipitation into methanol, the obtained block copolymer, PtBA-b-PSt (BP-4), was found to have Mn=48,000 and Mw/Mn=1.16 according to GPC. From this result, the molecular weights of the respective blocks were calculated to be 9,100 for the PtBA block and 38,900 for the PSt block. The results were well-consistent with the compositional ratio of the both blocks derived from the peak integral ratio in $^1$H-NMR.

Next, the obtained block copolymer BP-4 was mixed with trifluoroacetic acid (5 equivalents with respect to t-butyl group) at room temperature in chloroform to perform a deprotection reaction of the tert-butyl group of the PtBA block to effect a conversion to the carboxyl acid, whereby polyacrylic acid-b-polystyrene (PAA-b-PSt) (BP-5) was obtained.

The block copolymer BP-5 was present in a carboxylic acid-containing block in a volume fraction of 15%.

The block copolymer BP-5 was dissolved in THF, to which were then added sodium hydride (10 equivalents with respect to the carboxylic acid) and 1,3-propanesultone (20 equivalents with respect to the carboxylic acid). The mixture was heated to reflux to sulfonate the PAA block. Thus, a block copolymer (BP-6), which contained a sulfonic acid group as an ion-exchange group, was obtained. The block copolymer BP-6 contained the sulfonate-containing block in a volume fraction of 19% and the polystyrene block in a volume fraction of 81%.

Synthetic Example 3

Synthesis of Copolymer (BP-9) Including Sulfonic Acid-Containing Block and Polystyrene Block Under nitrogen atmosphere, 0.6 mmol of copper (I) bromide, 0.3 mmol of 1,1,4,7,10,10-hexamethyltriethylenetetramine, 0.2 mmol of methyl 2-bromopropionate, and 40 mmol of tert-butyl acrylate (tBA) were mixed. After the dissolved oxygen in the mixture was replaced with nitrogen, a reaction was performed at 70° C. The reaction was allowed to proceed while monitoring the polymerization rate through gas chromatography. The reaction was stopped by quenching with liquid nitrogen. The resultant poly(tert-butyl acrylate) (poly-tBA) was found to have Mn=15,400 and Mw/Mn=1.05 through GPC.

Then, 0.4 mmol of the thus obtained poly-tBA having bromine at a terminal, 0.4 mmol of copper(I) bromide, 0.4 mmol of hexamethyltriethylenetetramine, and 800 mmol of styrene were mixed and subjected to nitrogen purging. After a reaction was performed at 100° C., the reaction was stopped by quenching with liquid nitrogen. After the resulting polymer was purified by reprecipitation into methanol, the obtained block copolymer, PtBA-b-PSt (BP-7), was found to have Mn=41,600 and Mw/Mn=1.10 according to GPC. From this result, the molecular weights of the respective blocks were calculated to be 15,400 for the PtBA block and 26,200 for the PSt block. The results were well-consistent with the compositional ratio of both blocks derived from the peak integral ratio in $^1$H-NMR.

Next, the thus obtained block copolymer BP-7 was mixed with trifluoroacetic acid (5 equivalents with respect to t-butyl group) at room temperature in chloroform to perform a deprotection reaction of the tert-butyl group of the PtBA block to thereby effect a conversion to a carboxyl acid, whereby polyacrylic acid-b-polystyrene (PAA-b-PSt) (BP-8) was obtained.

The block copolymer BP-8 contained a carboxylic acid-containing block in a volume fraction of 32%.

The block copolymer BP-2 was dissolved in THF, to which were then added sodium hydride (10 equivalents with respect to the carboxylic acid) and 1,3-propanesultone (20 equivalents with respect to the carboxylic acid). The mixture was heated to reflux to sulfonate the PAA block. Thus, a block copolymer (BP-9) was obtained, which contained a sulfonic acid group as an ion-exchange group. The block copolymer BP-9 was present in the sulfonate-containing block in a volume fraction of 37% and the polystyrene block in a volume fraction of 63%.

Example 1

The block copolymer BP-3 prepared in Synthetic Example 1 having a sulfonic acid group as the ion-exchange group was dissolved in THF so as to give a solid content of 10% by weight.

The polymer solution was applied dropwise onto a glass substrate. The solvent was removed while applying a magnetic field (8 T) in a membrane plane direction to form a 50 μm-think cast membrane.

Figure 4:
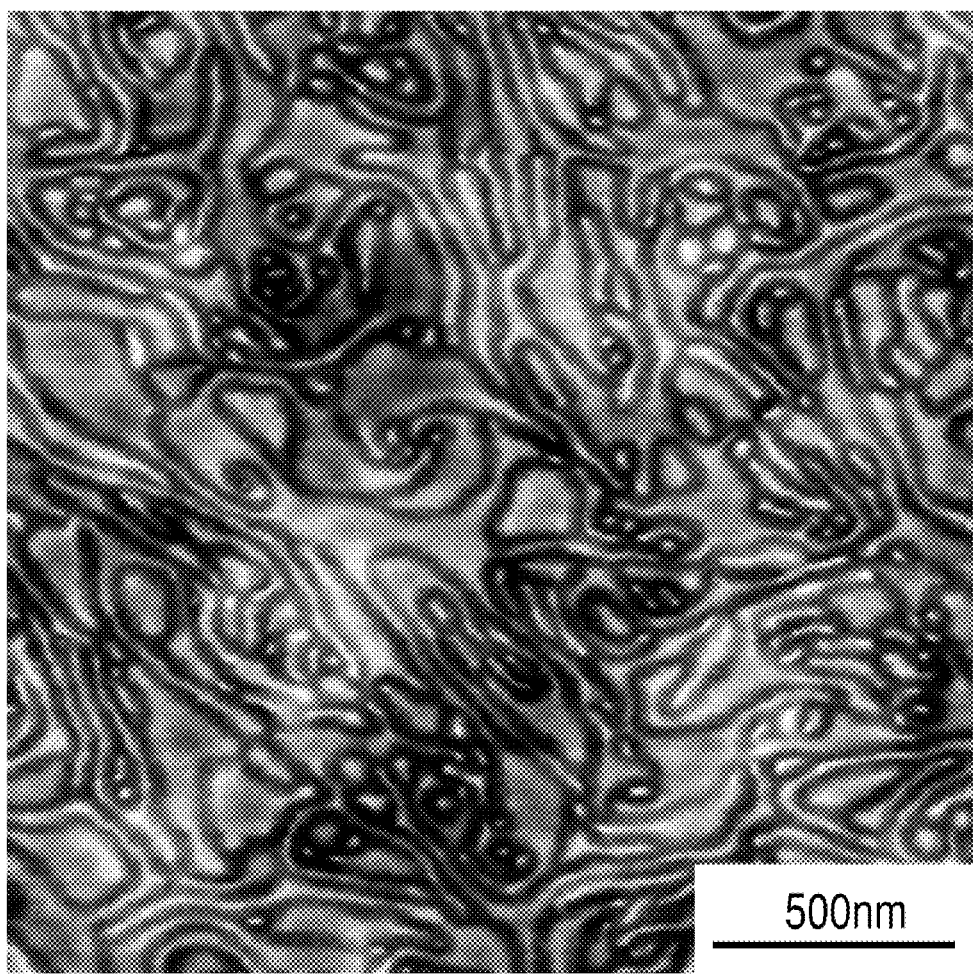
FIG. 4 is an atomic force microscope (AFM) photograph of a micro-phase separation structure of a block copolymer according to Example 1 of the present invention.

The surface of the thus obtained polymer membrane was observed with an AFM. The results are shown in FIG. 4. In the membrane, a worm-like structure, in which sulfonic acid group-containing hydrophilic domains are connected to each other, is formed extending over a wide range (10 μm square measuring range). From the AFM image, the continuous domains were found to have an average diameter of 19 nm. Further, continuous ion conductive domains contained in the image were extracted and the average of the areas of the ion conductive domains was calculated. By dividing the average area by the average diameter a, the persistence length b was found to be 86 μm. From this result, the aspect ratio b/a was found to be 4,500. Moreover, no grain boundary was observed in the 10 μm square measuring range. In addition, when the cross section of the polymer membrane was observed with a TEM, no grain boundary was observed inside the membrane and a phase separated structure of a worm-like structure was observed as is the case with the membrane surface.

Next, an AC impedance measurement (applied voltage: 5 mV; frequency: 1 Hz to 1 MHz) was performed through a four terminal method. The conductivity of the electrolyte membrane in a membrane plane direction was calculated based on the measured resistance. As a result, the ion conductivity was found to be 0.03 S·cm$^{-1}$ at a temperature of 50° C. and a relative humidity of 50%.

In addition, a 3 cm square piece of the polymer electrolyte membrane (thickness: 50 μm) was immersed in purified water for five hours. A change in the shape of the membrane before/after the immersion was measured. As a result, the membrane was found to have high mechanical strength, show substantially no swelling even when immersed in water, and have a small swelling ratio of 1%.

Example 2

The block copolymer BP-6 prepared in Synthetic Example 2 having a sulfonic acid group as the ion-exchange group was dissolved in THF so as to give a solid content of 10% by weight.

The polymer solution was applied dropwise onto a glass substrate. The solvent was removed while applying a magnetic field (8 T) in a membrane plane direction to form a cast membrane of 50 μm in thickness.

Figure 5:
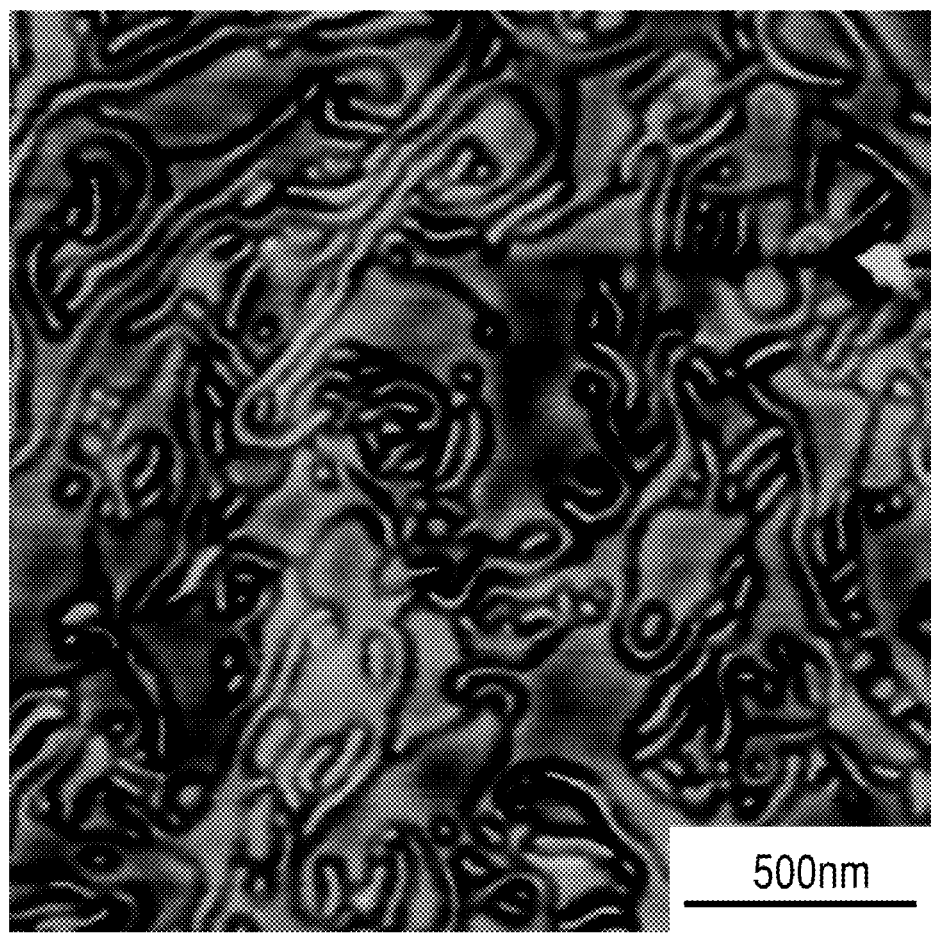
FIG. 5 is an atomic force microscope (AFM) photograph of a micro-phase separation structure of a block copolymer according to Example 2 of the present invention.

The surface of the thus obtained polymer membrane was observed with an AFM The results are shown in FIG. 5. In the membrane, a worm-like structure in which sulfonic acid group-containing hydrophilic domains are connected to each other is formed extending over a wide range (10 μm square measuring range). From the AFM image, the continuous domains were found to have an average diameter a of 18 nm. Further, continuous ion conductive domains contained in the image were extracted. The average of the areas of the ion conductive domains was calculated. By dividing the average area by the average diameter a, the persistence length b was found to be 63 μm. From this result, the aspect ratio b/a was determined to be 3,500. Moreover, no grain boundary was observed in the μm square measuring range. In addition, when the cross section of the polymer membrane was observed with a TEM, no grain boundary was observed inside the membrane, and a phase separated structure of a worm-like structure was observed as is the case with the membrane surface.

Next, an AC impedance measurement (applied voltage: 5 mV; frequency: 1 Hz to 1 MHz) was performed through a four terminal method. The conductivity of the electrolyte membrane in a membrane plane direction was calculated based on the measured resistance. As a result, the ion conductivity was found to be 0.01 S·cm$^{-1}$ at a temperature of 50° C. and a relative humidity of 50%.

In addition, a 3 cm square piece of the polymer electrolyte membrane (thickness: 50 μm) was immersed in purified water for five hours. A change in shape of the membrane before/after the immersion was measured. As a result, the membrane was found to have a high mechanical strength, show substantially no swelling even when immersed in water, and have a small swelling ratio of 0.8%.

Comparative Example 1

The block copolymer BP-3 prepared in Synthetic Example 1, which has a sulfonic acid group as the ion-exchange group, was dissolved in THF so as to give a solid content of 10% by weight. The solution was applied to a glass substrate by a casting method to form a cast membrane. The obtained cast membrane had a film thickness of 50 μm.

Figure 6:
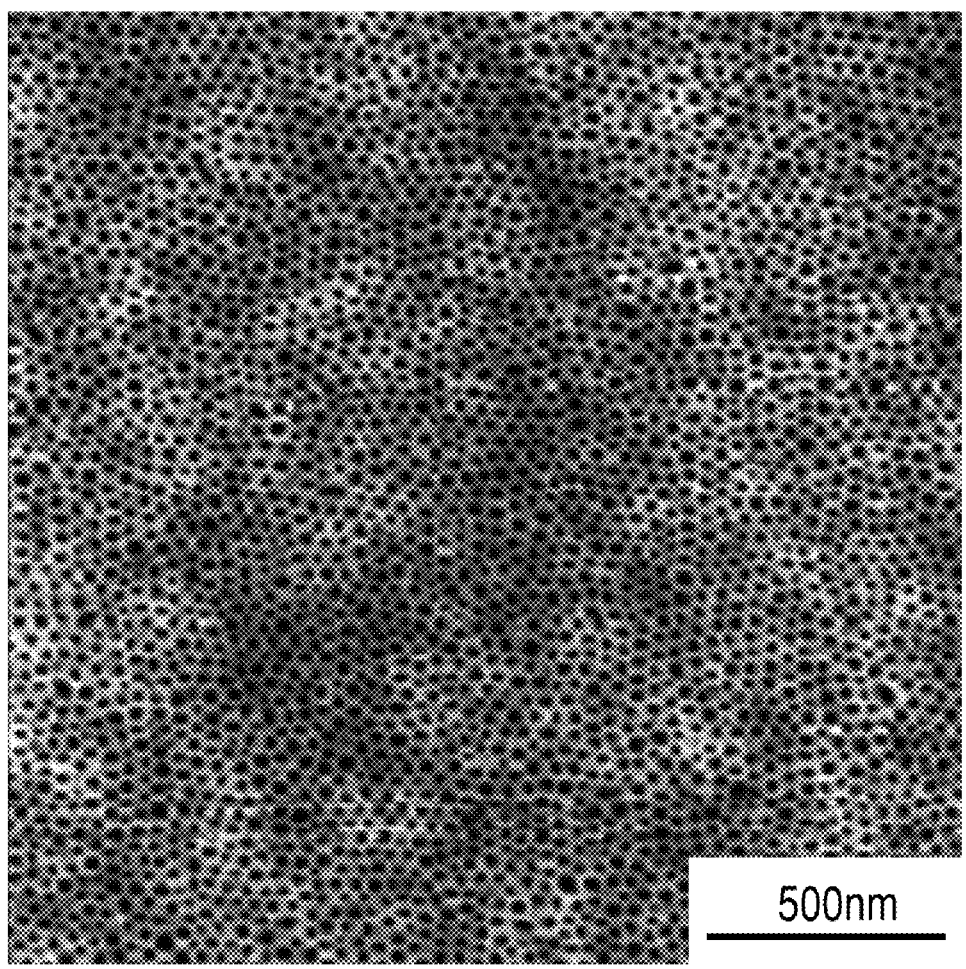
FIG. 6 is an atomic force microscope (AFM) photograph of a micro-phase separation structure of a block copolymer according to Comparative Example 1.

The result of AFM observation of the surface of the polymer membrane is shown in FIG. 6. There was observed a phase separated structure in which spherical domains formed of the sulfonic acid group-containing block copolymer are arranged in the polymer film (membrane). Further, when the cross section of the polymer membrane was observed with a TEM, a spherical phase separated structure was observed as is the case with the membrane surface.

Subsequently, an AC impedance measurement (applied voltage: 5 mV; frequency: 1 Hz to 1 MHz) was performed through a four-terminal method. As a result, the conductivity was not measurable. The reason for this is that since the spherical domains formed of the sulfonic acid group-containing blocks are present in a scattered manner apart from one another in the membrane, the ion conductive channels are discontinuous, increasing the membrane resistance.

Comparative Example 2

The block copolymer BP-9 prepared in Synthetic Example 3 having a sulfonic acid group as the ion-exchange group was dissolved in THF to give a solid content of 10% by weight. The solution was applied to a glass substrate by a casting method to form a cast membrane.

Figure 7:
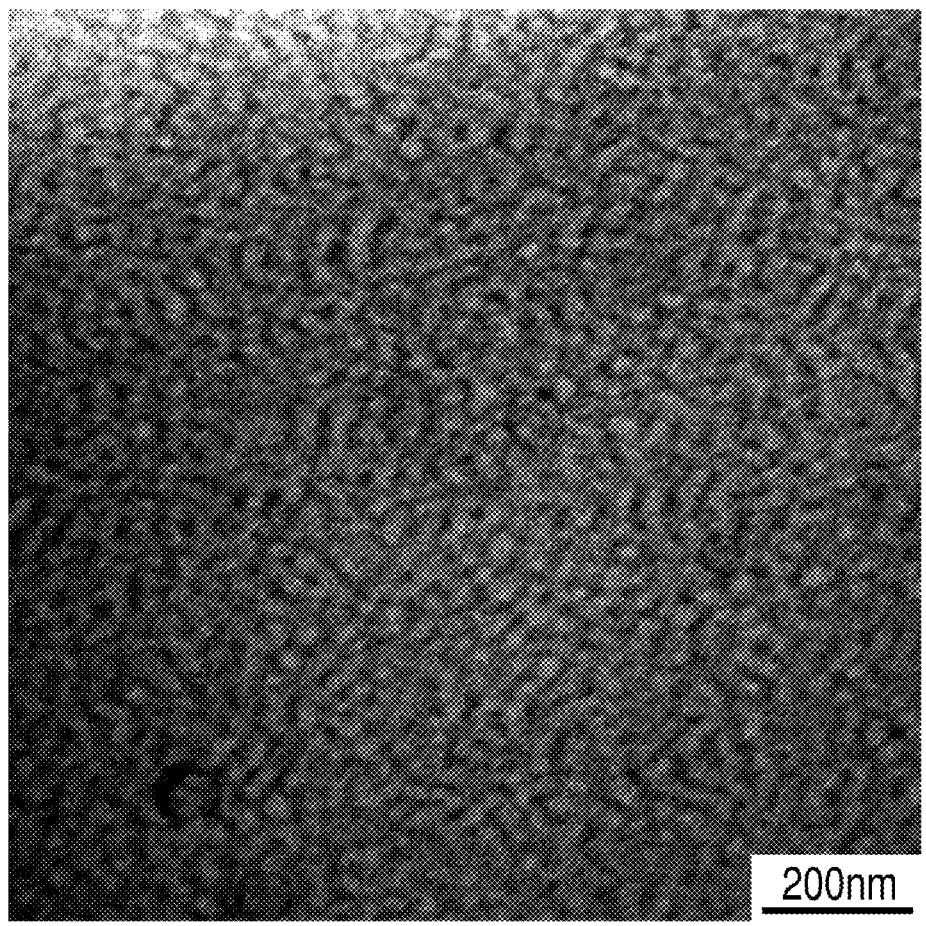
FIG. 7 is a transmission electron microscope (TEM) photograph of a micro-phase separation structure of a block copolymer according to Comparative Example 2.

FIG. 7 shows the results of an AFM observation of the surface of the polymer electrolyte membrane. There was observed a state in which domains formed of the sulfonic acid group-containing block copolymers are phase-separated in a network fashion in the polymer membrane.

Subsequently, an AC impedance measurement (applied voltage: 5 mV; frequency: 1 Hz to 1 MHz) was performed through a four terminal method. The conductivity of the electrolyte membrane in a membrane plane direction was calculated based on the measured resistance. As a result, the ion conductivity was found to be 0.04 S·cm$^{-1}$ at a temperature of 50° C. and a relative humidity of 50%.

In addition, a 3 cm square piece of the polymer electrolyte membrane (thickness: 50 μm) was immersed in purified water for five hours. A change in the shape of the membrane before/after the immersion was measured. As a result, the membrane was found to swell by about 5% and to have a decreased mechanical strength. As described above, it was confirmed that the polymer electrolyte membrane according to Comparative Example 2 has a conductivity equivalent to that of the polymer electrolyte membrane according to Example 1, but contains the hydrophilic blocks in a volume fraction higher than that of the polymer electrolyte membrane according to Example 1, which led to inferior mechanical strength compared to that of the polymer electrolyte membrane according to Example 1.

Example 3

A membrane electrode assembly and a fuel cell unit were prepared through the steps as described below by way of an example.

HiSPEC1000 (trade name; manufactured by Johnson & Massey Co.) was used as a powdery catalyst. A Nafion solution (trade name; manufactured by DuPont Co.) was used as an electrolyte solution. Initially, the powdery catalyst and the electrolyte solution were mixed to form a mixed dispersion liquid. This dispersion liquid was applied in a film shape to a PTFE sheet by a doctor blade method to form a catalyst sheet. The prepared catalyst sheet was transferred onto each face of the electrolyte membrane prepared in Example 1 through hot pressing by a decal method at 150° C. and 100 kgf/cm$^2$ to prepare a membrane electrode assembly. The membrane electrode assembly was sandwiched between carbon cloth electrodes (manufactured by BASF Fuel Cell, Inc. (E-TEK Co. The sandwiched assembly was held between collecting electrodes and clamped to produce a fuel cell.

Figure 8:
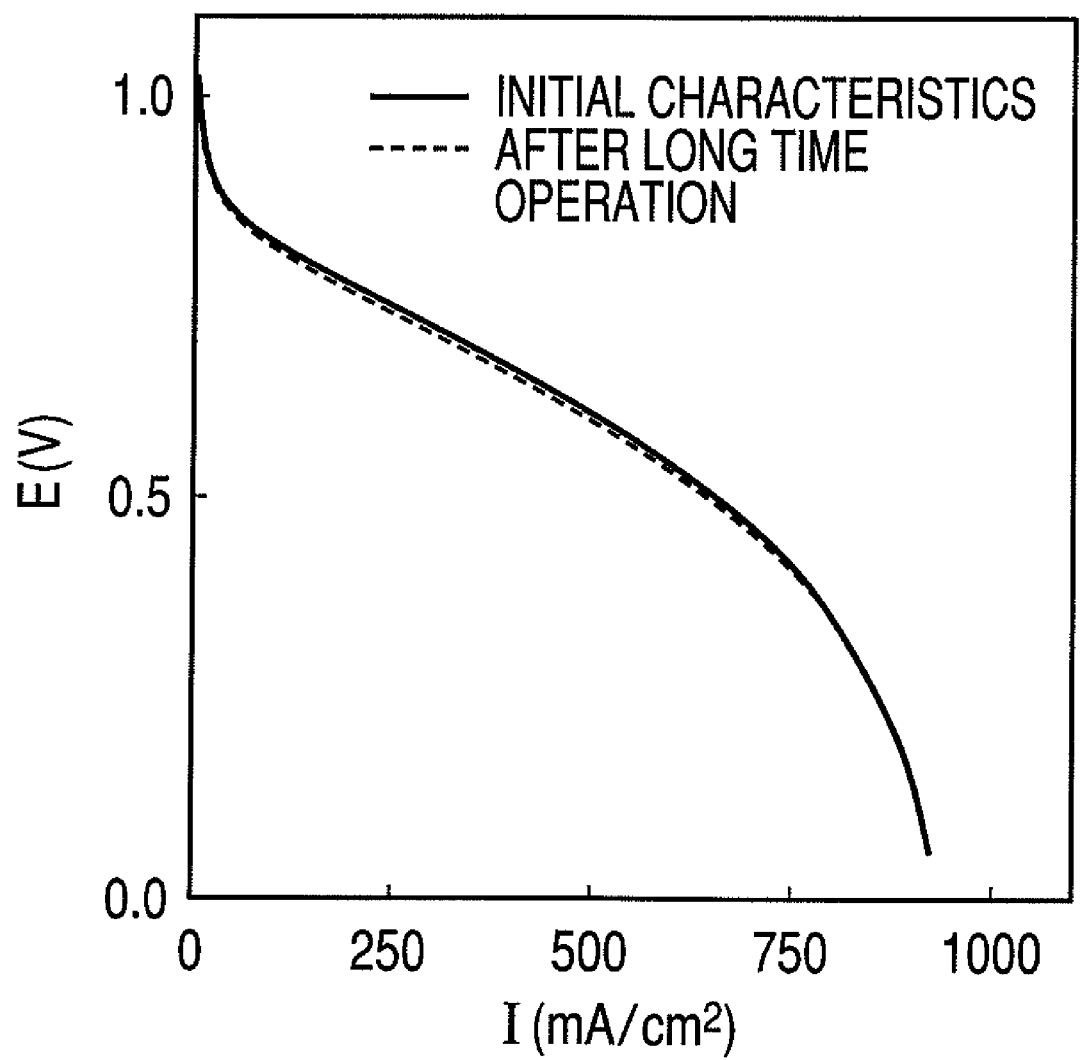
FIG. 8 is a graphical representation illustrating the evaluation results of fuel cell characteristic of a membrane electrode assembly according to Example 3 of the present invention.

To operate the thus produced fuel cell, hydrogen gas was supplied to an anode side at an injection rate of 300 mL/min, and air was supplied to a cathode side; a cell outlet pressure was kept at atmospheric pressure; the relative humidity was kept at 50% both at the anode and at the cathode; and the cell temperature was kept at 50° C. When the operation (measurement) at a constant current was conducted at a current density of 400 mA/cm$^2$, the cell maintained stable characteristics even after continuous operation for ten hours. The cell output characteristics before/after the measurement are shown in FIG. 8. It was confirmed that the characteristics did not change after the measurement.

The polymer membrane according to the present invention is formed of a microphase-separated film with a high strength constituted of domains with long continuity extending over a wide range without being segmented (or divided) due to grain boundaries and can, therefore, be suitably utilized for an ion conductive membrane, a membrane electrode assembly, and a fuel cell.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-120000, filed Apr. 27, 2007, which is hereby incorporated by reference herein its entirety.

What is claimed is:

1. A polymer electrolyte membrane, which comprises a block copolymer comprising an ion conductive block and a non-ion conductive block and has a micro-phase separation structure constituted of an ion conductive domain comprising the ion conductive block and a non-ion conductive domain comprising the non-ion conductive block,
   wherein a volume fraction of the non-ion conductive block in the block copolymer is 75% or more and less than 95%,
   wherein the ion conductive domain forms a bent, branched, arched, and/or repeatedly connected to each other worm-shaped continuous phase,
   wherein the non-ion conductive domain forms a matrix portion, and
   wherein an aspect ratio b/a of an average diameter a and a persistence length b of the ion conductive domain is 100 or more.

2. The polymer electrolyte membrane according to claim 1, wherein the ion conductive block comprises a polymer having an ion-exchange group.

3. A membrane electrode assembly comprising the polymer electrolyte membrane set forth in claim 1.

4. A fuel cell comprising the membrane electrode assembly set forth in claim 3.

5. The polymer electrolyte membrane according to claim 1, wherein the aspect ratio b/a is 1000 or more.

* * * * *